US008971079B2

(12) United States Patent
Tateyama et al.

(10) Patent No.: US 8,971,079 B2
(45) Date of Patent: Mar. 3, 2015

(54) INVERTER DEVICE

(75) Inventors: Tetsuro Tateyama, Hitachinaka (JP); Seiji Funaba, Hitachinaka (JP); Yasuo Noto, Hitachinaka (JP); Koichi Yahata, Hitachinaka (JP); Hiroki Shimano, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 172 days.

(21) Appl. No.: 13/638,287

(22) PCT Filed: Mar. 31, 2011

(86) PCT No.: PCT/JP2011/058272
§ 371 (c)(1),
(2), (4) Date: Nov. 13, 2012

(87) PCT Pub. No.: WO2011/125863
PCT Pub. Date: Oct. 13, 2011

(65) Prior Publication Data
US 2013/0051099 A1   Feb. 28, 2013

(30) Foreign Application Priority Data
Apr. 1, 2010   (JP) ................. 2010-085099

(51) Int. Cl.
*H02M 3/24*   (2006.01)
*H02M 7/5387*   (2007.01)

(52) U.S. Cl.
CPC ................... *H02M 7/5387* (2013.01)

USPC .......................................................... 363/98

(58) Field of Classification Search
USPC .......... 363/55, 56.01, 56.02, 97, 98, 131, 132
See application file for complete search history.

(56) References Cited

U.S. PATENT DOCUMENTS 6,556,458 B2 *   4/2003   Ohmura et al. ................. 363/37

FOREIGN PATENT DOCUMENTS

| JP | 2001-258268 A | 9/2001 |
| JP | 2002-75622 A | 3/2002 |
| JP | 2008-244729 A | 10/2008 |

OTHER PUBLICATIONS

Corresponding International Search Report with English Translation dated Jul. 5, 2011 (two (2) pages).
Japanese Office Action dated Aug. 20, 2013 (two (2) pages).

* cited by examiner

*Primary Examiner* — Gary L Laxton
*Assistant Examiner* — Afework Demisse
(74) *Attorney, Agent, or Firm* — Crowell & Moring LLP

(57) ABSTRACT

An inverter device includes an inverter circuit, a control circuit, a first drive circuit, a second drive circuit, first and second photocouplers, and a signal switching part. The signal switching part directly transmits the first and second signals outputted from the first photocoupler and the second photocoupler to the corresponding first and second drive circuits respectively when at least one of the first and second signals is an OFF command.

3 Claims, 11 Drawing Sheets

FIG. 5

| Pin | Nin | Pout | Nout |
|-----|-----|------|------|
| H | H | H | H |
| H | L | H | L |
| L | H | L | H |
| L | L | H | H |

PREVENTION OF SHORT-CIRCUITING

INVERTER DEVICE

TECHNICAL FIELD

The present invention relates to an inverter device having a circuit for preventing short-circuiting of upper and lower arms of an inverter circuit.

BACKGROUND ART

In an inverter device using a semiconductor switching element, a PWM signal which is a pulse string signal alternately repeating an ON signal and an OFF signal is outputted to respective gate drive circuits for upper and lower arms from a PWM, circuit, and both switching elements for upper and lower arms are turned on or off by the gate drive circuit for upper and lower arms.

Usually, for preventing both switching elements for upper and lower arms from being turned on simultaneously due to irregularities in delay time in outputting a PWM signal from the PWM circuit to the gate drive circuit, a dead time is provided to the PWM circuit for shifting turn-on timing between both switching elements for upper and lower arms. However, there is a case where simultaneous ON signals are outputted by being adversely affected by noises or the like. When the simultaneous ON signals are outputted, a power source and a ground are short-circuited to each other thus giving rise to a drawback that the switching element is broken due to a large electric current which flows at the time of short-circuiting.

In view of the above, to cope with a case where such a simultaneous ON signal is generated, there has been proposed the constitution where a simultaneous ON protection circuit is provided on a signal path between a PWM circuit and a gate drive circuit (see PTL 1, for example).

PRIOR ART DOCUMENT

Patent Document

PTL 1: JP-A-2002-75622

SUMMARY OF INVENTION

Technical Problem

However, in the constitution described in PTL 1, the simultaneous ON protection circuit is provided between the PWM circuit and the gate drive circuit and hence, a PWM signal outputted from the PWM circuit is inputted to respective gate drive circuits for upper and lower arms via the simultaneous ON protection circuit. Accordingly, ON/OFF timing of a signal outputted from the gate drive circuit is always affected by the simultaneous ON protection circuit regardless of the presence or non-presence of the generation of a simultaneous ON signal. As a result, with respect to a dead time generated by the PWM circuit, at the time that a PWM signal passes through the simultaneous ON protection circuit, due to the influence exerted by the delay time between an input and an output of an element in the simultaneous ON protection circuit, the difference in irregularities in delay time is generated between the upper and lower arms thus giving rise to a drawback that a dead time changes between the upper and lower arms at the time of inputting a signal to the switching element.

Accordingly, it is necessary to expand a dead time in advance with respect to an output signal of the PWM circuit. However, when the dead time is increased, there arises a drawback that a waveform of an output current from an inverter is distorted so that irregularities in rotation of a motor become large or a drawback that a maximum value of an ON period of the PWM circuit is limited so that amplitude of a maximum output current cannot be increased.

Solution to Problem

According to first aspect of the invention, there is provided an inverter device which includes: an inverter circuit which includes an upper-arm-use first switching element and a lower-arm-use second switching element; a control circuit which outputs a first signal which is an ON/OFF command for the first switching element and a second signal which is an ON/OFF command for the second switching element respectively; a first drive circuit which performs ON/OFF driving of the first semiconductor switching element based on the ON/OFF command which is the first signal; a second drive circuit which performs ON/OFF driving of the second semiconductor switching element based on the ON/OFF command which is the second signal; and a signal switching part which directly inputs the first and second signals outputted from the control circuit to the corresponding first and second drive circuits respectively when at least one of the first and second signals is an OFF command, and interrupts inputting of the first signal to the first drive circuit and inputting of the second signal to the second drive circuit and inputs a third signal which is an OFF command to the first and second drive circuits when both the first and second signals are ON commands.

According to a second aspect of the invention, in the inverter device of the first aspect of the invention, the signal switching part may preferably include: a third switching element which switches the interruption and the non-interruption of a first signal path connecting the control circuit and the first drive circuit to each other, and brings the first drive circuit into an OFF command input state when the first signal path is interrupted; a fourth switching element which switches the interruption and the non-interruption of a second signal path connecting the control circuit and the second drive circuit to each other, and brings the second drive circuit into an OFF command input state when the second signal path is interrupted; and a logic circuit which is connected to the first and second signal paths in parallel, outputs an interruption command to the third and fourth switching elements when both the first and second signals are ON commands, and outputs a non-interruption command to the third and fourth switching elements when at least one of the first and second signals is an OFF command.

According to a third aspect of the invention, in the inverter device of the second aspect of the invention, the first and second drive circuits may preferably include a driver IC for generating a gate voltage respectively, and a short pulse filter time of the driver IC is set longer than a response time from a point of time that the first and second signals in an ON command state are inputted to the logic circuit to a point of time that the third and fourth switching elements are brought into an interruption state.

According to a fourth aspect of the invention, in the inverter device of the second or third aspect of the invention, a resistor which prevents the reflection of a signal may preferably be connected in series to a signal output side of the logic circuit.

Advantageous Effects of Invention

According to the invention, short-circuiting between the upper and lower arm switching elements can be prevented and, also, a dead time is not affected by a signal which is an ON/OFF command outputted from the control circuit.

BRIEF DESCRIPTION OF DRAWINGS

FIG. 5 A view showing a truth-value table of the simultaneous ON protection circuit.

DESCRIPTION OF EMBODIMENTS

Hereinafter, the mode for carrying out the invention is explained in conjunction with drawings. An inverter device according to the embodiment of the invention is applicable to a hybrid automobile or a pure electric vehicle. Hereinafter, the explanation is made with respect to a case where the inverter device according to the embodiment of the invention is applied to a hybrid automobile as a typical example. The inverter device according to the embodiment of the invention is explained by taking, as an example, a vehicle-mounted power conversion device of a vehicle-mounted electric machinery system mounted on an automobile, particularly, a vehicle drive inverter device which is used in the vehicle driving electric machinery system and is subject to an extremely severe mounting environment, an extremely severe operation environment or the like.

The vehicle drive inverter device is provided to a vehicle driving electric machinery system as a control device for controlling driving of a vehicle drive motor, and controls driving of a vehicle drive motor in such a manner that the vehicle drive inverter device converts DC power supplied from a vehicle-mounted battery which constitutes a vehicle-mounted power source or a vehicle-mounted power generator into predetermined AC power, and supplies the obtained AC power to the vehicle drive motor. The vehicle drive motor also has a function of a power generator and hence, the vehicle drive inverter device also has a function of converting AC power generated by the vehicle drive motor into DC power corresponding to an operation mode thereof. The converted DC power is supplied to a vehicle-mounted battery. The constitution of this embodiment is optimally used as the power conversion device for driving a vehicle such as an automobile or a truck.

Figure 1:
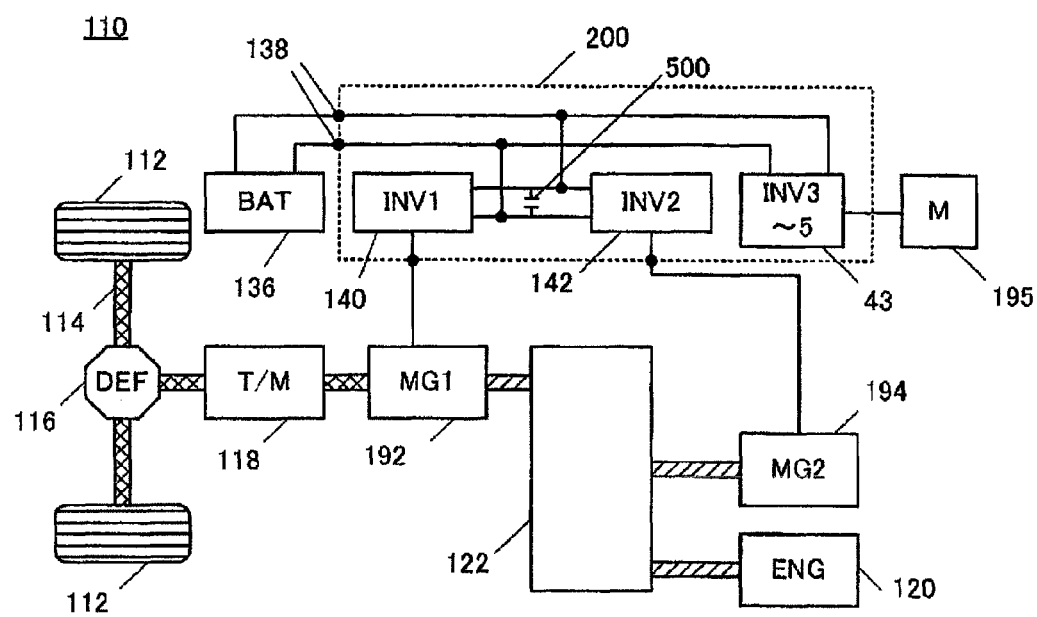
FIG. 1 A view showing a control block of a hybrid automobile.

FIG. 1 is a view showing a control block of a power conversion device 200 in a case where the inverter device according to this embodiment of the invention is applied to a hybrid automobile. In FIG. 1, the hybrid electric vehicle (hereinafter described as "HEV") 110 includes two vehicle driving systems. The first vehicle driving system is an engine system where an engine 120 which constitutes an internal combustion engine is used as a power source, and is mainly used as a drive source of the HEV. The second vehicle driving system is a vehicle-mounted electric machinery system where motor generators 192, 194 are used as a power source, and is mainly used as a drive source of the HEV and as a power generation source for the HEV.

The motor generators 192, 194 are, for example, synchronous machines or induction machines, and are operated as motors or as generators depending on an operation method and hence, they are referred to as motor generators in this specification. A front-wheel axle 114 is rotatably and pivotally supported on a front portion of a vehicle body. A pair of front wheels 112 is mounted on both ends of the front wheel axle 114 respectively. A rear-wheel axle (not shown in the drawing) is rotatably and pivotally supported on a rear portion of the vehicle body. A pair of rear wheels is mounted on both ends of the rear wheel axle respectively. The HEV of this embodiment adopts a so-called front wheel drive system where a main wheel which is driven by power is constituted of the front wheel 112, and a follower wheel which is rotated due to the rotation of the front wheel 112 is constituted of the rear wheel. However, it may be possible to adopt a system opposite to the above-mentioned system, that is, a rear wheel drive system.

A front-wheel-side differential gear (hereinafter described as "front-wheel-side DEF") 116 is mounted on a center portion of the front wheel axle 114. The front wheel axle 114 is mechanically connected to an output side of the front-wheel-side DEF 116. An output shaft of a transmission 118 is mechanically connected to an input side of the front-wheel-side DEF 116. The front-wheel-side DEF 116 is a differential power distribution mechanism which distributes a rotational drive force transmitted with a speed changed by the transmission 118 to left and right front wheel axles 114.

An output side of the motor generator 192 is mechanically connected to an input side of the transmission 118. An output side of the engine 120 and an output side of the motor generator 194 are mechanically connected to an input side of the motor generator 192 by way of a power distribution mechanism 122. The motor generators 192, 194 and the power distribution mechanism 122 are housed in the inside of a housing of the transmission 118.

The motor generators 192, 194 are synchronous machines where a rotor is provided with a permanent magnet. Driving of the motor generators 192, 194 is controlled in such a manner that AC power supplied to windings of an armature of a stator is controlled by inverter devices 140, 142 of the power conversion device 200. A battery 136 is electrically connected to the inverter devices 140, 142, and power is supplied to and received from the battery 136 and the inverter devices 140, 142. This embodiment includes two electrically-operated power generating units, that is, a first electrically-operated power generating unit which is constituted of the motor generator 192 and the inverter device 140, and a second electrically-operated power generating unit which is constituted of the motor generator 194 and the inverter device 142, and these power generating units are used selectively corresponding to an operation state.

That is, when a vehicle is driven by power from the engine 120, to assist a drive torque of the vehicle, power is generated using the second electrically-operated power generating unit as the power generating unit by operating the second electrically-operated power generating unit by power from the engine 120, and the first electrically-operated power generating unit is operated as the electrically-operated unit using power obtained by such power generation. Further, in a similar case, to assist a vehicle speed of the vehicle, power is generated using the first electrically-operated power generating unit as the power generating unit by operating the second electrically-operated power generating unit by power of the engine 120, and the second electrically-operated power generating unit is operated as the electrically-operated unit by power obtained by such power generation.

Further, in this embodiment, by operating the first electrically-operated power generating unit as the electrically-operated unit using power of the battery 136, the vehicle can be driven using only power of the motor generator 192. Further, in this embodiment, power is generated by operating the first electrically-operated power generating unit or the second electrically-operated power generating unit as the power generating unit using power of the engine 120 or power from the wheel, and the battery 136 is charged with the generated power.

The battery 136 is also used as a power source for driving the motor 195 used as an accessory. As such an accessory, for example, a motor for driving a compressor of an air conditioner or a motor for driving a hydraulic pump for control is named. DC power is supplied to the inverter device 43 from the battery 136 and is converted into AC power by the inverter device 43, and the AC power is supplied to the motor 195.

The inverter device 43 has substantially the same function as the inverter device 140 or 142, and controls a phase, frequency and power of an alternating current supplied to the motor 195. For example, by supplying AC power having a leading phase with respect to the rotation of a rotor of the motor 195, the motor 195 generates a torque. On the other hand, by generating AC power having a lag phase, the motor 195 is operated as a generator so that the motor 195 performs an operation in a regenerative braking state.

The control function of such an inverter device 43 is substantially equal to the control function of the inverter device 140, 142. The capacitance of the motor 195 is smaller than the capacitance of the motor generator 192, 194 and hence, the maximum conversion power of the inverter device 43 is smaller than the maximum conversion power of the inverter device 140 or 142. However, the circuit constitution of the inverter device 43 is basically equal to the circuit constitution of the inverter device 140, 142.

The inverter devices 140, 142, the inverter device 43 and a capacitor module 500 have the close electrical relationship. Further, these devices have commonality with respect to a point that these devices require a countermeasure to cope with the generation of heat. Still further, there is a demand for the reduction of volumes of these devices as much as possible. In view of the above, the power conversion device described hereinafter houses the inverter devices 140, 142, the inverter device 43 and the capacitor module 500 in the housing thereof.

Due to such a constitution, it is possible to realize the miniaturized device having high reliability. Further, by housing the inverter devices 140, 142, the inverter device 43 and the capacitor module 500 in one housing, wiring can be effectively simplified and countermeasure against noises can be effectively taken. Further, inductance of a connection circuit between the capacitor module 500, the inverter devices 140, 142 and the inverter device 43 can be reduced so that a spike voltage can be reduced, and it is also possible to enhance the reduction of heat generation and the heat radiation efficiency.

Figure 2:
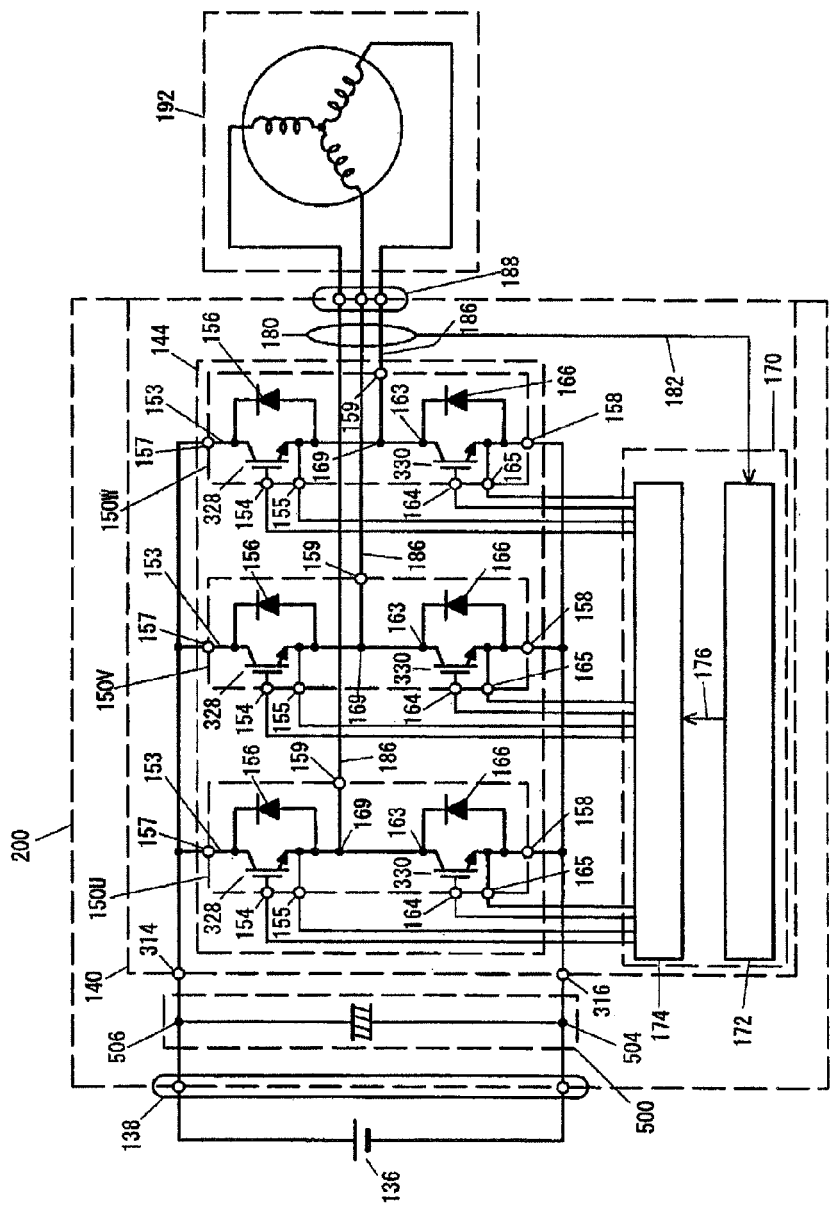
FIG. 2 A view showing the constitution of an inverter device 140.

Next, the electrical circuit constitution of the inverter devices 140, 142 and the inverter device 43 is explained in conjunction with FIG. 2. In the embodiment shown in FIG. 1 and FIG. 2, the explanation is made by taking a case where the inverter devices 140, 142 and the inverter device 43 are respectively individually constituted as an example. The respective inverter devices 140, 142 and the inverter device 43 have substantially the same constitution, perform substantially the same operation, and have substantially the same functions and hence, the inverter device 140 is explained hereinafter as a typical example.

The power conversion device 200 according to this embodiment includes the inverter device 140 and the capacitor module 500, and the inverter device 140 includes an inverter circuit 144 and a control part 170. The control part 170 includes a driver circuit 174 for controlling driving of the inverter circuit 144, and a control circuit 172 which supplies a control signal to the driver circuit 174 via a signal line 176.

The inverter circuit 144 is constituted of a three-phase bridge circuit, and includes upper and lower arm series circuits 150 amounting to three phases. The respective upper and lower arm series circuits 150 are electrically connected in parallel between a DC positive pole terminal 314 and a DC negative pole terminal 316. The DC positive pole terminal 314 is electrically connected to a positive pole side of the battery 136, and a DC negative pole terminal 316 is electrically connected to a negative pole side of the battery 136.

The upper and lower arm series circuit 150 includes an IGBT 328 (insulation gate type bipolar transistor) and a diode 156 which are operated as an upper arm, and an IGBT 330 and a diode 166 which are operated as a lower arm. An intermediate point portion (intermediate electrode 169) of each upper and lower arm series circuit 150 is connected to an AC power line (AC bus bar) 186 which leads to the motor generator 192 via an AC terminal 159.

The IGBTs 328, 330 of the upper arm and the lower arm are power semiconductor elements for switching, are operated in response to a drive signal outputted from the control part 170, and convert DC power supplied from the battery 136 into three-phase AC power. The converted power is supplied to windings of an armature of the motor generator 192.

The IGBT 328, 330 includes a collector electrode 153, 163, an emitter electrode (emitter electrode terminal 155, 165 for a signal), and a gate electrode (gate electrode terminal 154, 164). As shown in the drawing, the diode 156, 166 is electrically connected between the collector electrode 153, 163 and the emitter electrode of the IGBT 328, 330. Each diode 156, 166 includes two electrodes consisting of a cathode electrode and an anode electrode. The cathode electrode is electrically connected to the collector electrode of the IGBT 328, 330, and the anode electrode is electrically connected to the emitter electrode of the IGBT 328, 330 respectively such that the direction from the emitter electrode to the collector electrode of the IGBT 328, 330 becomes the forward direction.

An MOSFET (metal oxide semiconductor field effect transistor) may be used as the power semiconductor element for switching. In this case, the diode 156 and the diode 166 become unnecessary. As described above, upper and lower arm series circuits 150 amounting to three phases are provided corresponding to respective-phase windings of the armature winding of the motor generator 192. In three upper and lower arm series circuits 150, an intermediate electrode 169 which constitutes an intermediate point portion of each arm (that is, a connection portion between the emitter electrode of the IGBT 328 and the collector electrode 163 of the IGBT 330) is electrically connected to the corresponding phase winding of the armature winding of the motor generator 192 via the AC terminal 159 and the AC connector 188.

The upper and lower arm series circuits 150 are electrically connected in parallel to each other. The collector electrode 153 of the IGBT 328 of the upper arm is electrically connected to a positive pole side capacitor electrode of the capacitor module 500 via the positive pole terminal (P terminal) 157 and via a DC bus bar. On the other hand, the emitter electrode of the IGBT 330 of the lower arm is electrically connected to a negative pole side capacitor electrode of the capacitor module 500 via a negative pole terminal (N terminal) 158 and via the DC bus bar.

The capacitor module 500 constitutes a smoothing circuit which suppresses the fluctuation of a DC voltage generated by a switching operation of the IGBT 328, 330. A positive pole side of the battery 136 is electrically connected to the positive pole side capacitor electrode of the capacitor module 500 via a DC connector 138 and a negative pole side of the battery 136 is electrically connected to the negative pole side capacitor electrode of the capacitor module 500 via the DC connector 138. Due to such a constitution, the capacitor module 500 is connected between the collector electrode 153 of the upper arm IGBT 328 and the positive pole side of the battery 136, and is also connected between the emitter electrode of the lower arm IGBT 330 and the negative pole side of the battery 136 whereby the capacitor module 500 is electrically connected in parallel to the battery 136 and the upper and lower arm series circuits 150.

The control part 170 includes the control circuit 172 and the driver circuit 174. The control circuit 172 generates a timing signal for controlling switching timing of the IGBT 328, 330 based on input information from other control devices and sensors. The driver circuit 174 generates a drive signal for making the IGBT 328, 330 perform a switching operation based on a timing signal outputted from the control circuit 172.

The control circuit 172 includes a microcomputer for arithmetically processing switching timing of the IGBT 328, 330 (hereinafter described as "micon"). To the micon, as input information, a target torque value which a motor generator 192 is required to satisfy, a value of an electric current supplied to windings of the armature of the motor generator 192 from upper and lower arm series circuit 150, and magnetic pole positions of the rotor of the motor generator 192 are inputted. The target torque value is based on a command signal outputted from an upper control device not shown in the drawing. The current value is detected based on a detection signal 182 outputted from the current sensor 180. The magnetic pole positions are detected based on a detection signal outputted from a rotation magnetic pole sensor (not shown in the drawing) mounted on the motor generator 192. In this embodiment, the explanation is made by taking the case where a value of an electric current amounting to three phases is detected as an example. However, there is no problem in detecting a value of an electric current amounting to two phases.

The micon in the control circuit 172 calculates current command values on d and q axes of the motor generator 192 based on a target torque value. Then, voltage command values on d and q axes are calculated based on the differential between the calculated current command values on d and q axes and the detected current values on d and q axes. Further, the calculated voltage command values on d and q axes are converted into voltage command values of a U phase, a V phase and a W phase based on the detected magnetic pole positions. Further, the micon in the inside of the control circuit 172 generates a pulse-shaped modulated wave based on a comparison between a basic wave (sinusoidal wave) based on voltage command values of a U phase, a V phase and a W phase and a carrier wave (triangular wave), and outputs the generated modulated wave to the driver circuit 174 as a PWM (pulse width modulation) signal.

Here, the driver circuit 174, to drive the lower arm, amplifies a PWM signal and outputs the amplified PWM signal to the gate electrode of the IGBT 330 of the lower arm as a drive signal. On the other hand, the driver circuit 174, to drive the upper arm, shifts a level of a reference potential of the PWM signal to a level of a reference potential of the upper arm, amplifies the PWM signal, and outputs the amplified PWM signal to the gate electrode of the IGBT 328 of the upper arm as the drive signal. Due to such a constitution, the respective IGBTs 328, 330 perform a switching operation based on inputted drive signals.

The control part 170 protects the upper and lower arm series circuit 150 by performing the detection of abnormality (over-current, over-voltage, over-temperature or the like). For this end, sensing information is inputted to the control part 170. For example, from the signal-use emitter electrode terminals 155, 165 of the respective arms, information on electric currents supplied to the emitter electrodes of the respective IGBTs 328, 330 is inputted to drive parts (IC) corresponding to the emitter electrode terminals 155, 165. Due to such an operation, each drive part (IC) performs the detection of an over-current, and when the over-current is detected, a switching operation of the corresponding IGBT 328, 330 is stopped thus protecting the corresponding IGBT 328, 330 from the over-current.

Information on a temperature of the upper and lower arm series circuit 150 is inputted to the micon from the temperature sensor (not shown in the drawing) mounted in the upper and lower arm series circuit 150. Further, information on voltage on a DC positive pole side of the upper and lower arm series circuit 150 is inputted to the micon. The micon performs the detection of an over-temperature and the detection of an over-voltage based on these information. When the over-temperature or the over-voltage is detected, the micon completely stops a switching operation of all IGBTs 328, 330. Due to such an operation, it is possible to protect the upper and lower arm series circuit 150 (eventually, a semiconductor module including the circuit 150) from the over-temperature or the over-voltage.

An operation of making the IGBTs 328, 330 of the upper and lower arms which are provided to the inverter circuit 144 conductive and an operation of blocking the upper and lower arms are switched in accordance with a fixed sequence. An electric current in the windings of the armature of the motor generator 192 at the time of switching flows through a circuit constituted of the diodes 156, 166.

The upper and lower arm series circuits 150 include, as shown in the drawing, a positive terminal (P terminal, positive pole terminal) 157, a negative terminal (N terminal, negative pole terminal) 158, an AC terminal 159 led from an intermediate electrode 169 of the upper and lower arms, a signal-use terminal (signal-use emitter electrode terminal) 155 of the upper arm, the gate electrode terminal 154 of the upper arm, a signal-use terminal (signal-use emitter electrode terminal) 165 of the lower arm, and the gate electrode terminal 164 of the lower arm.

The power conversion device 200 includes the DC connector 138 on an input side and an AC connector 188 on an output side, and is connected to the battery 136 and the motor generator 192 via the respective connectors 138, 188. The power conversion device 200 may have the circuit constitution where two upper and lower arm series circuits are connected in parallel to each other in each phase.

Figure 3:
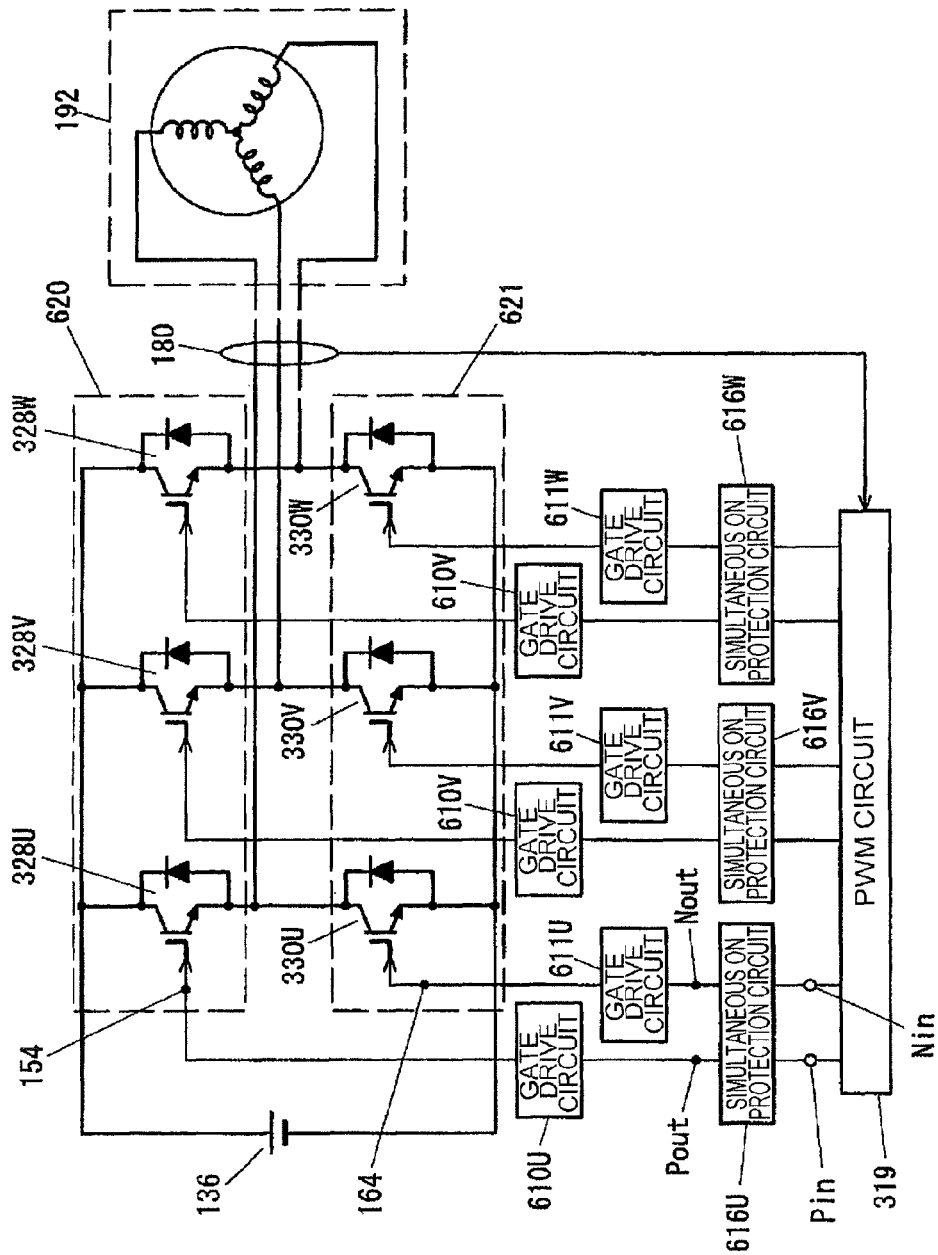
FIG. 3 A view showing a simultaneous ON protection circuit of the inverter device 140.

FIG. 3 is a view for explaining the inverter system according to this embodiment, and shows the constitution of the control part 170 of the inverter device shown in FIG. 2 in more detail. The control part 170 includes a PWM circuit 319 in which a CPU, a counter circuit, an input/output circuit and the like are incorporated, gate drive circuits 610U, 610V, 610W, 611U, 611V, 611W for driving IGBTs 328U, 328V, 328W, 330U, 330V, 330W which constitute the above-mentioned switching elements, and simultaneous ON protection circuits 616U, 616V, 616W which calculate signals outputted from the PWM circuit 319 and protect the inverter from short-circuiting.

Here, the simultaneous ON protection circuits correspond to PWM signal pairs of the upper and lower arms 620, 621 such that the simultaneous ON protection circuit 616U corresponds to the gate drive circuits 610U, 611U, the simultaneous ON protection circuit 616V corresponds to the gate drive circuits 610V, 611V, and the simultaneous ON protection circuit 616W corresponds to the gate drive circuits 610W, 611W. The simultaneous ON protection circuit 616U is provided between the PWM circuit 319 and the gate drive circuits 610U, 611U. Other simultaneous ON protection circuits 616V, 616W are also arranged in the same manner.

In the circuit constitution shown in FIG. 3, a current sensor 180 detects electric currents which the IGBTs 328U to 330W constituting switching elements output, and makes the PWM circuit 319 perform a PWM (pulse width modulation) arithmetic operation so as to set the deviation between a predetermined value and a detected current value to zero. Then, a PWM signal (pulse signal) which alternately repeats an ON signal and an OFF signal is outputted to the gate drive circuits 610U to 611W from the PWM circuit 319. Since the gate drive circuits 610U to 611W are constituted by a negative logic, an ON signal assumes a logic "L" level and an OFF signal assumes a logic "H" level.

(Constitution of Gate Drive Circuits and Simultaneous ON Protection Circuits)

Figure 4:
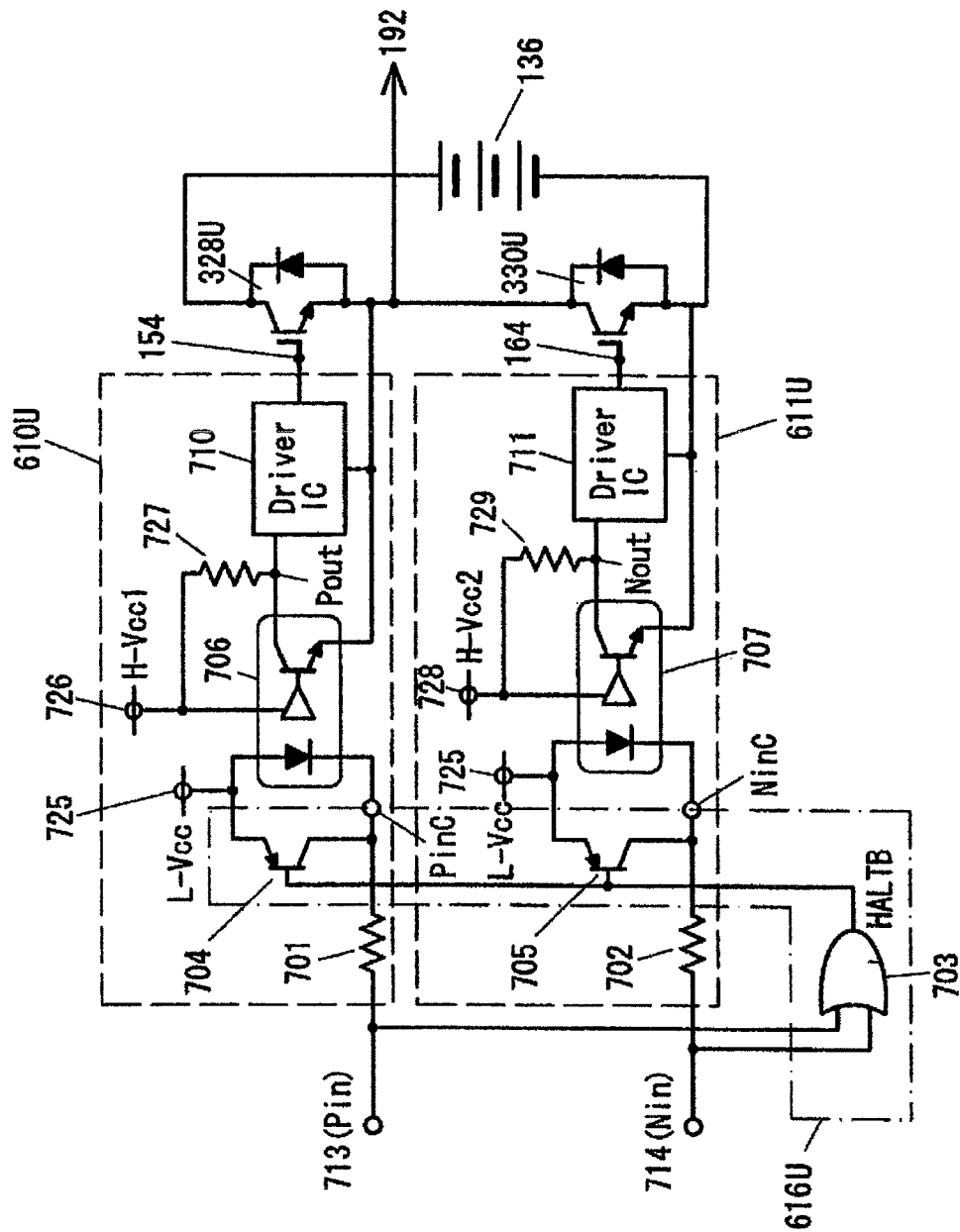
FIG. 4 A view showing the circuit constitutions of gate drive circuits 610U, 611U and a simultaneous ON protection circuit 616U.

FIG. 4 is a view showing the circuit constitution of the gate drive circuits 610U, 611U and the simultaneous ON protection circuit 616U. The circuit constitution of the V phase and the circuit constitution of the W phase are substantially equal to the circuit constitution of the U phase. The gate drive circuit 610U on an upper arm side is constituted of a primary power source 725 (L-Vcc), a secondary power source 726 (H-Vcc1), an input resistor 701, a photocoupler 706, a photocoupler output-use pull-up resistor 727, and a driver IC 710.

An upper arm switching signal terminal 713 is connected to an input of a primary cathode of the photocoupler 706 via an input resistor 701. Assume a signal inputted to the terminal 713 as Pin. An input of the primary anode of the photocoupler 706 is connected to the primary power source 725 (L-Vcc). An output of a secondary collector of the photocoupler 706 is connected to the secondary power source 726 via the pull-up resistor 727, and is connected to an input terminal of the driver IC 710. Further, an output of a secondary emitter of the photocoupler 706 is connected to a ground terminal of the driver IC 710. An output of the driver IC 710 is connected to a gate electrode terminal 154 of the IGBT 328U.

The gate drive circuit 611U on a lower arm side is constituted of: a primary power source 725 (L-Vcc), a secondary power source 728 (H-Vcc2), an input resistor 702, a photocoupler 707, a photocoupler-output-use pull-up resistor 729, and a driver IC 711. The gate drive circuit 611U substantially has the same constitution as the gate drive circuit 610U. A lower arm switching signal terminal 714 is connected to an input of a primary cathode of the photocoupler 707 via an input resistor 702. Assume a signal inputted to the terminal 714 as Nin. An input of a primary anode of the photocoupler 707 is connected to a primary power source 725 (L-Vcc), and an output of a secondary collector is connected to a secondary power source 728 (H-Vcc2) via the pull-up resistor 729 and is connected to an input terminal of the driver IC 711. An output of a secondary emitter of the photocoupler 707 is connected to a ground terminal of the driver IC 711. An output of the driver IC 711 is connected to a gate electrode terminal 164 of the IGBT 330U.

The simultaneous ON protection circuit 616U is constituted of an OR gate circuit 703 and PNP bipolar transistors 704, 705. The upper arm switching signal terminal Pin and the lower arm switching signal terminal Nin are connected to an input of the OR gate circuit 703. An output of the OR gate circuit 703 is connected to bases of the PNP bipolar transistors 704, 705. A collector and an emitter of the PNP bipolar transistor 704 are connected to an input of a primary cathode and anode of the photocoupler 706 respectively. A collector and an emitter of the PNP bipolar transistor 705 are connected to an input of a primary cathode and anode of the photocoupler 707, respectively.

(Manner of Operation of Gate Drive Circuits and Simultaneous ON Protection Circuits)

An upper arm switching signal Pin supplied from the PWM circuit 319 is inputted to an upper arm switching signal terminal 713 of the gate drive circuit 610U. On the other hand, a lower arm switching signal Nin supplied from the PWM circuit 319 is inputted to a lower arm switching signal terminal 714 of a gate drive circuit 611U. These signals outputted from the PWM circuit 319 are negative logic signals so that "L" level means active. That is, "L" level corresponds to turning-on of the IGBT 328U, 330U.

Firstly, considered is a case where the upper arm switching signal terminal 713 is at "H" level. In this case, a primary cathode input voltage of the photocoupler 706 becomes equal to a voltage of the primary power source 725 (L-Vcc) via the input resistor 701. As a result, in the photo diode of the photocoupler 706, a bias voltage is not applied between a cathode and an anode so that the photo diode is in an OFF state. Accordingly, an output transistor of the photocoupler 706 is also in an OFF state so that an output of the photocoupler 706, that is, an input Pout of the driver IC 710 assumes "H" level by being pulled up by the secondary power source 726 (H-Vcc1). Accordingly, the driver IC 710 outputs "L" level to the gate electrode terminal 154 of the IGBT 328U so that the IGBT 328U is turned off.

Next, considered is a case where "L" level is inputted to the upper arm switching signal terminal 713. In this case, a primary cathode input voltage of the photocoupler 706 is lowered via the input resistor 701 so that a forward bias voltage is applied to a photo diode of the photocoupler 706 via the input resistor 701. As a result, an output transistor of the photocoupler 706 is turned on so that an output of the photocoupler 706, that is, an input Pout of the driver IC 70 assumes "L" level. Then, the driver IC 70 brings the gate electrode terminal 154 of the IGBT 328U into "H" level so that the IGBT 328U is turned on.

The gate drive circuit 611U on a lower arm side also has the same constitution as the gate drive circuit 610U, and a lower arm switching signal is inputted to the lower arm switching signal terminal Nin from the PWM circuit 319.

In a case where the lower arm switching signal terminal 714 is at "H" level, a primary cathode input voltage of the photocoupler 707 becomes equal to a voltage of the primary power source 725 (L-Vcc) via the input resistor 702. As a result, in the photo diode of the photocoupler 707, a bias voltage is not applied between a cathode and an anode so that the photo diode is in an OFF state. Accordingly, an output transistor of the photocoupler 707 is also in an OFF state so that an input Nout of the driver IC 711 which is an output of the photocoupler 707 assumes "H" level by being pulled up by the secondary power source 728 (H-Vcc2). Accordingly, the driver IC 711 outputs "L" level to the gate electrode terminal 164 of the IGBT 330U so that the IGBT 330U is turned off.

On the other hand, in a case where "L" level is inputted to the lower arm switching signal terminal 714, a primary cathode input voltage of the photocoupler 707 is lowered via the input resistor 702 so that a forward bias voltage is applied to a photo diode of the photocoupler 707 via the input resistor 702. As a result, an output transistor of the photocoupler 707 is turned on so that an input Nout of the driver IC 711 which is an output of the photocoupler 707 assumes "L" level. Then, the driver IC 711 brings the gate electrode terminal 164 of the IGBT 33013 into "H" level so that the IGBT 33013 is turned on.

Next, the manner of operation of the simultaneous ON protection circuit 616U is explained. To an input side of the OR gate circuit 703 of the simultaneous ON protection circuit 616U, signals Pin, Nin which are inputted to an upper arm switching signal terminal 713 and a lower arm switching signal terminal 714 are inputted. Accordingly, when "L" level is simultaneously inputted to both the upper arm switching signal terminal 713 and the lower arm switching signal terminal 714 (simultaneous ON signal), the OR gate circuit 703 outputs "L" level, and in other cases (cases where either one of the terminals 713, 714 is at "H" level), the OR gate circuit 703 outputs "H" level.

When "L" level is simultaneously inputted to both the upper arm switching signal terminal 713 and the lower arm switching signal terminal 714 so that the OR gate circuit 703 outputs "L" level, the PNP bipolar transistors 704, 705 are turned on. As a result, irrespective of the output levels of the upper arm switching signal terminal Pin and the lower arm switching signal terminal Nin, primary anode-cathode voltages of the photocouplers 706, 707 are forcedly set to approximately 0V (Vcesat). That is, the supply of a simultaneous ON signal to the photocouplers 706, 707 is interrupted.

When primary anode-cathode voltages of the photocouplers 706, 707 are forcedly set to approximately 0V (Vcesat), output transistors of the photocouplers 706, 707 are turned off so that an input Pout to the driver IC 710 and an input Nout to the driver IC 711 are set at "H" level respectively. As a result, the driver IC 710 outputs "L" to the gate electrode terminal 154 of the IGBT 328U so that the IGBT 328U is turned off. In the same manner, the driver IC 711 also outputs "L" to the gate electrode terminal 164 of the IGBT 330U so that the IGBT 330U is turned off.

To consider a case where the simultaneous ON protection circuit 616U is not provided, when a simultaneous ON signal is inputted to the gate drive circuits 610U, 611U as a PWM signal due to noises or the like, both the IGBTs 328U, 330U of the upper and lower arms are simultaneously turned on so that a power source and a ground are short-circuited whereby a large electric current is generated in the IGBTs 328U, 330U, and the IGBTs 328U, 330U are broken. To the contrary, with the provision of the simultaneous ON protection circuit 616U, when such a simultaneous ON signal is generated, "L" level is outputted to the IGBTs 328U, 330U so that the IGBTs 328U, 330U of the upper and lower arms are turned off whereby such short-circuiting can be prevented.

On the other hand, when a simultaneous ON signal is not inputted, that is, when "H" level is inputted to either one of the upper arm switching signal terminal 713 and the lower arm switching signal terminal 714, the OR gate circuit 703 outputs "H" level so that the PNP bipolar transistors 704, 705 are turned off. That is, an input PinC of the photocoupler 706 and an input NinC of the photocoupler 707 are not affected so that the gate drive circuits 610U, 611U are operated in accordance with upper arm and lower arm switching signals from the PWM circuit 319.

For example, assuming a delay time of output "L"→"H" of the gate drive circuit 610U as TpLH 610U and a delay time of output "H"→"L" of the gate drive circuit 611U as TpLH 611U, a dead time Tdead at gate terminals of the IGBTs 328U, 330U is expressed by a following formula (1). As a result, there is no possibility that the simultaneous ON protection circuits 616U, 616V, 616W affect the dead time of the upper and lower switching elements.

$$T\text{dead} = T\text{dead } 319 + TpLH\ 610 - TpHL\ 611 \tag{1}$$

In this manner, the simultaneous ON protection circuits 616U, 616V, 616W are operated in accordance with a truth-value table shown in FIG. 5. That is, when a simultaneous ON signal is inputted, the simultaneous ON protection circuits 616U, 616V, 616W forcedly bring input signals supplied to the gate drive circuits 610U to 611W into a logic "H" so that both upper and lower switching elements are turned off whereby short-circuiting of both the upper and lower switching elements is prevented thus protecting the switching elements. Further, by arranging the simultaneous ON protection circuit 616U in parallel to the gate drive circuits 610U, 611U, as expressed in the formula (1), there is no possibility that the dead time Tdead of the gate electrode terminals 154, 164 of the IGBTs 328U, 330U is affected.

Figure 6:
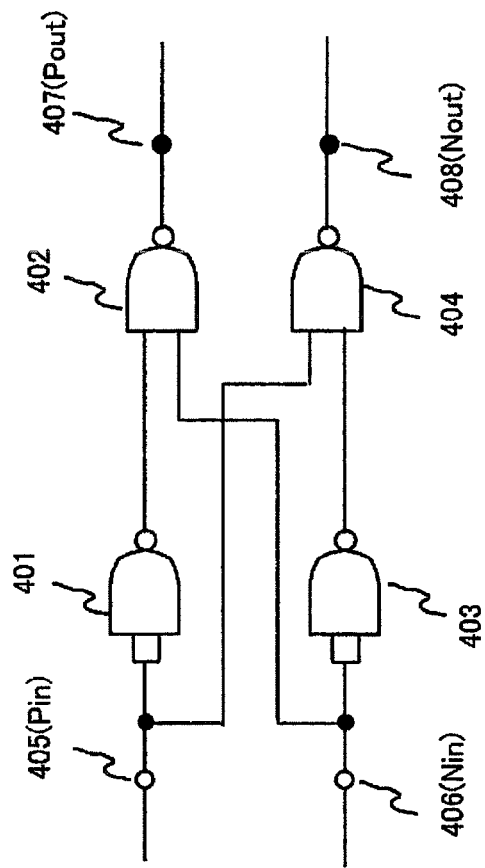
FIG. 6 A block diagram showing the constitution of a simultaneous ON protection circuit in a comparison example.

FIG. 6 shows a comparison example. That is, FIG. 6 shows the circuit constitution of a simultaneous ON protection circuit having substantially the same constitution as the prior art. The simultaneous ON protection circuit is constituted of NAND circuits 401 to 404 which calculate signals supplied from the PWM circuit 319. Assume PWM signals which are inputted to the upper arm input terminal 405 and the lower arm input terminal 406 of the simultaneous ON protection circuit as Pin and Nin respectively. In the same manner, assume PWM signals which are outputted from the upper arm output terminal 407 and the lower arm output terminal 408 as Pout and Nout respectively. Also in the case of the simultaneous ON protection circuit 316U shown in FIG. 6, a truth-value table is expressed by the above-mentioned FIG. 5.

As described previously, the PWM circuit 319 is, for preventing the occurrence of simultaneous turning-on due to irregularities in delay time from the PWM circuit 319 to the gate drive circuits 610U, 611U, provided with a zone where switching is not performed in response to an output signal by delaying ON timing of both upper and lower arm switching elements or advancing OFF timing of both upper and lower arm switching elements. This zone is the above-mentioned dead time Tdead 319.

In the constitution shown in FIG. 6, the PWM signals inputted to the simultaneous ON protection circuit are, irrelevant of whether or not these signals are a simultaneous ON signal, outputted to the gate drive circuits 610U, 611U via the NAND circuits 401 to 404 in the simultaneous ON protection circuit. Accordingly, timing of signals outputted from the gate drive circuits 610U, 611U are, irrespective of the generation of the simultaneous ON signal, always affected by the simultaneous ON protection circuit so that the difference in delay irregularities (ON/OFF skew) between the upper and lower arms is added to the timing before the signals reach the gate drive circuits 610U, 611U.

That is, the dead time Tdead 2 at the gate electrode terminals 154, 164 of the IGBTs 328U, 330U is expressed by a following formula (2). Here, Tdead 319 is a dead time generated by the PWM circuit 319, TpLH401 is delay time at a point of time that an output of the NAND circuit 401 is changed from "L"→"H", TpHL402 is a delay time at a point of time that an output of the NAND circuit 402 is changed from "H"→"L", TpLH 310 is a delay time at a point of time that an output of the gate drive circuit 610U is changed from "L"→"H", TpHL403 is a delay time at a point of time that an output of the NAND circuit 403 is changed from "H"→"L", TpLH404 is a delay time at a point of time that an output of the NAND circuit 404 is changed from "L"→"H", and TpHL 311 is a delay time at a point of time that an output of the gate drive circuit 611U is changed from "H"→"L".

$$Tdead=Tdead\ 319+(TpLH401+TpHL402+TpLH310)-(TpHL403+TpLH404+TpHL311) \quad (2)$$

Accordingly, in the comparison example shown in FIG. 6, the dead time differs between the case where the simultaneous ON protection circuit is provided and the case where the simultaneous ON protection circuit is not provided so that when a PWM signal is transmitted through the simultaneous ON protection circuit, the difference in delay time irregularities Tskew expressed by a following formula (3) is generated.

$$Tskew=(TpLH401+TpHL402)-(TpHL403+TpLH404) \quad (3)$$

On the other hand, according to this embodiment, as described above, when "H" level is inputted to either one of the upper arm switching signal terminal 713 and the lower arm switching signal terminal 714, that is, a simultaneous ON signal is not generated, a PWM signal passes through the simultaneous ON protection circuit 616U without being affected by the simultaneous ON protection circuit 616U and is inputted to the gate drive circuits 610U, 61113 so that no difference in delay time irregularities Tskew is generated.

(Timing Chart and Hazard)

Figure 7:
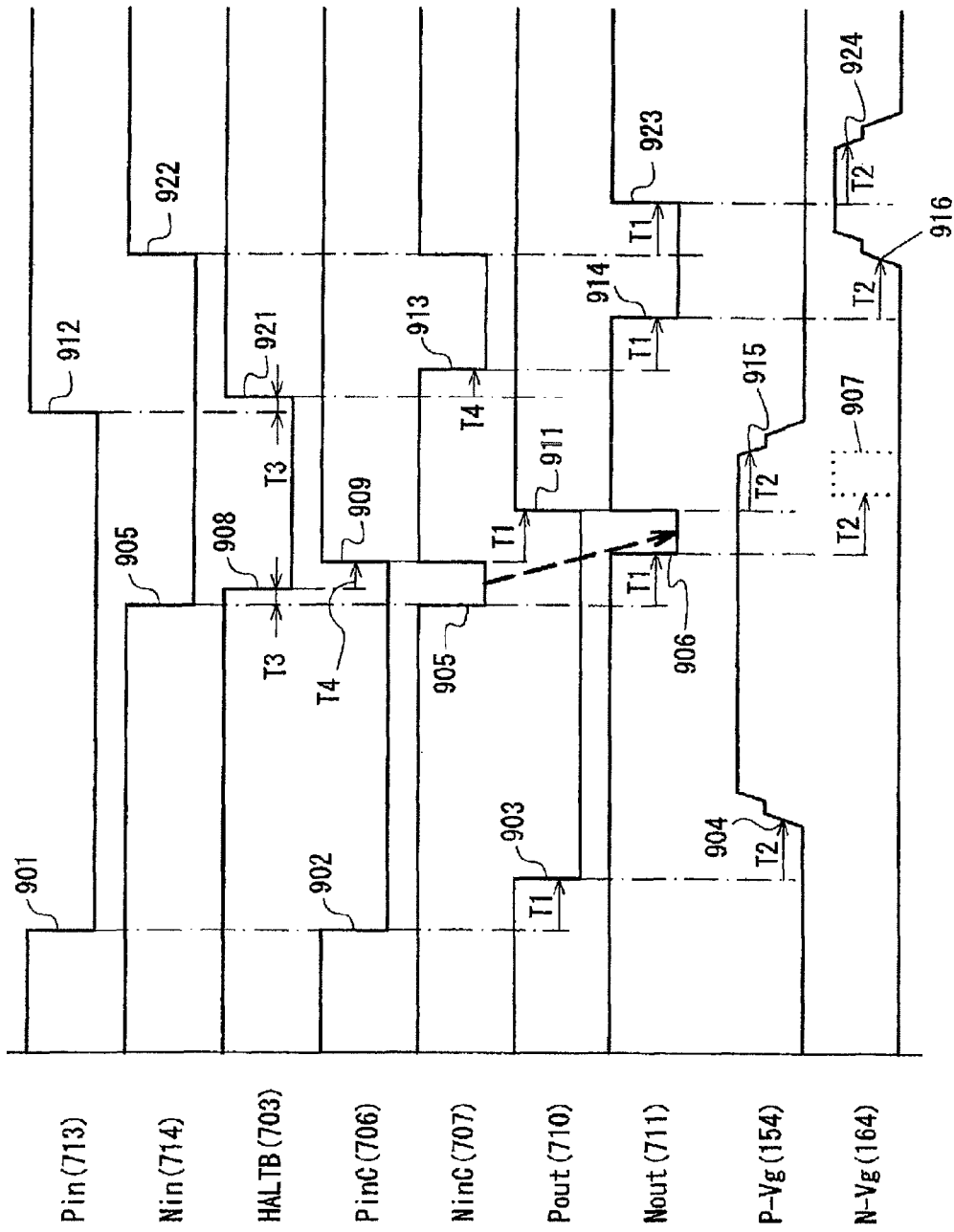
FIG. 7 A timing chart for explaining the manner of operation of the simultaneous ON protection circuit 616U.

FIG. 7 is a timing chart for explaining the manner of operation of the simultaneous ON protection circuit 616U shown in FIG. 4. In FIG. 7, Pin and Nin indicate signals which are inputted to the upper arm switching signal terminal 713 and the lower arm switching signal terminal 714, HALTB indicates an output signal of the OR gate circuit 703, PinC and NinC indicate signals inputted to the photocouplers 706, 707, Pout and Nout indicate signals inputted to the drivers IC 710, 711, and P-Vg and N-Vg indicate gate signals inputted to gate electrode terminals 154, 164.

FIG. 7 shows an example where simultaneous ON signals are generated. That is, with respect to the signal Pin inputted to the upper arm switching signal terminal 713, a signal level becomes "H"→"L" at timing 901 and becomes "L"→"H" at timing 912. On the other hand, at timing 905 prior to timing 912, a signal Nin of the lower arm switching signal terminal 714 becomes "H"→"L". Then, the signal Nin becomes "L"→"H" at timing 922. Accordingly, during a period between the timing 905 and the timing 912, both signals Pin, Nin assume "L" level so that IBGTs 328U, 330U of the upper and lower arms are simultaneously turned on when the simultaneous ON protection circuit 616U is not provided.

When the signal Pin becomes "H"→"L" at the timing 901, the input signal PinC of the photocoupler 706 also becomes "H"→"L" at timing 902. Then, after a lapse of delay time T1 in the photocoupler 706, the input signal Pout of the driver IC 710 becomes "H"→"L" at timing 903. Thereafter, at timing 904 after a lapse of delay time T2 of the driver IC 710, a signal level of a gate signal P-Vg of the IGBT 328U becomes "L"→"H" so that the IGBT 328U is turned on.

Next, at timing 905 before the signal Pin inputted to the upper arm switching terminal 713 returns "L"→"H", a signal level of the signal Nin inputted to the lower arm switching signal terminal 714 becomes "H"→"L". Here, an input signal NinC of the photocoupler 707 readily becomes "H"→"L". Since both signal levels of the signals Pin and Nin assume "L", at timing 908 after a lapse of the delay time T3 of the OR gate circuit 703, an output signal HALTB of the OR gate circuit 703 becomes "H"→"L" so that the PNP bipolar transistors 704, 705 are turned on at timing 909 after a lapse of a delay time T4 of the PNP bipolar transistors 704, 705. When the PNP bipolar transistors 704, 705 are turned on, the input signals PinC, NinC of the photocouplers 706, 707 become "L"→"H". As a result, simultaneous ON signals are interrupted.

However, the delay times T3 and T4 are provided in the OR gate circuit 703 and the PNP bipolar transistors 704, 705 respectively and hence, time delay (T3+T4) is generated after an input signal NinC of the photocoupler 707 becomes "H"→"L" at timing 905 and before signals PinC, NinC become "L"→"H" at timing 909. Although this time delay is approximately 10 to 20 ns, even when the simultaneous ON protection circuit 616U is operated, there arises a period where both signals PinC, NinC become "L" level (from the timing 905 to the timing 909) by an amount of this delay time. That is, the simultaneous ON signal remains.

This simultaneous ON signal is also succeeded by an input signal Pout of the driver IC 710 and an input signal Nout of the driver IC 711, and the input signal Nout of the driver IC 711 which is at "H" level becomes "H"→"L" at timing 906 after a lapse of delay time T1 in the photocoupler 707 from timing 905 at which the simultaneous ON signal is generated. Then, when the signal NinC becomes "L"→"H" at timing 909, input signals Pout, Nout of the driver IC 710, 711 become "L"→"H" at timing 911 after a lapse of the delay time T1 in the photocouplers 706, 707. That is, a hazard (a short pulse between the timing 906 and the timing 911) occurs in the input signal Nout of the driver IC 711.

In this manner, the above-mentioned hazard occurs in the simultaneous ON protection circuit 616U. However, in general, a short pulse filter is provided in the inside of a driver IC. For example, on a data sheet of a driver IC described in NPL 1 (Infineon Technology, "1EDO20112-F Single IGBT Driver IC Datasheet Ver. 2.1", p. 12 paragraph: Input Pulse Suppression IN+, IN−), filtering of inputting of a hazard having a pulse width of not more than 30 ns is described, and on a data sheet of a driver IC described in NPL 2 (STMicroelectronics, "TD351 Advanced IGBT/MOSFET Driver Data sheet", p. 4 paragraph: tonmin, p 54.1 Input stage), filtering of inputting of a hazard having a pulse width of not more than 100 ns is described.

Accordingly, the above-mentioned hazard of short time which appears in the signal Nout is filtered by the driver IC 711 so that, as indicated by a dotted line 907 indicative of a signal N-Vg, the hazard is not outputted to the gate electrode terminal 164 of the IGBT 330U whereby the short-circuiting of the upper and lower arms is avoided. On the other hand, with respect to the upper arm, a gate signal P-Vg of the IGBT 328U becomes "H"→"L" at timing 915 after a lapse of an amount of delay time T2 of the driver IC 710.

Next, when the signal Pin of the upper arm switching terminal 713 becomes "L"→"H" at timing 912, the simultaneous ON signal state is finished. As a result, at timing 921 after a lapse of delay time T3 of the OR gate circuit 703, the output signal HALTB of the OR gate circuit 703 becomes "L"→"H", and at timing 913 after a lapse of delay time T4 of the PNP bipolar transistors 704, 705, the PNP bipolar transistors 704, 705 are turned off. Here, since the signal Nin of the lower arm switching terminal 714 is "L", the input signal NinC of the photocoupler 707 becomes "H"→"L" whereby the input signal Nout of the driver 711 becomes "H"→"L" at timing 914 after a lapse of an amount of delay time T1 of the photocoupler 707. Then, the gate signal N-Vg of the IGBT 330U becomes "L"→"H" at timing 916 after a lapse of an amount of delay time T2 of the driver IC 711.

Thereafter, when the signal Nin of the lower arm switching terminal 714 becomes "L"→"H" at timing 922, the input signal NinC of the photocoupler 707 becomes "L"→"H" and, further, at timing 923 after a lapse of an amount of delay time T1 of the photocoupler 707, the input signal Nout of the driver 711 becomes "L"→"H". Then, at timing 924 after a lapse of an amount of delay time T2 of the driver IC 711, the gate signal N-Vg of the IGBT 330U becomes "H"→"L".

In this manner, with respect to the simultaneous ON protection circuit 616U of the invention, when a simultaneous ON signal is inputted to the simultaneous ON protection circuit 616U, the simultaneous ON protection circuit 616U interrupts a control signal thus turning off the IBGTs 328U, 330U of the upper and lower arms. On the other hand, when "H" level is inputted to either one of the upper arm switching signal terminal 713 and the lower arm switching signal terminal 714, that is, when the simultaneous ON signal is not generated, a PWM signal is made to pass through the simultaneous ON protection circuit 616U without being affected by the simultaneous ON protection circuit 616U. Therefore, the simultaneous ON protection circuit 616U does not affect the dead time of upper and lower arms switching signals. Accordingly, the distortion of waveform of the inverter output current can be reduced so that it is possible to provide an inverter which has small rotational irregularities of the motor and large output current amplitude.

Second Embodiment

Figure 8:
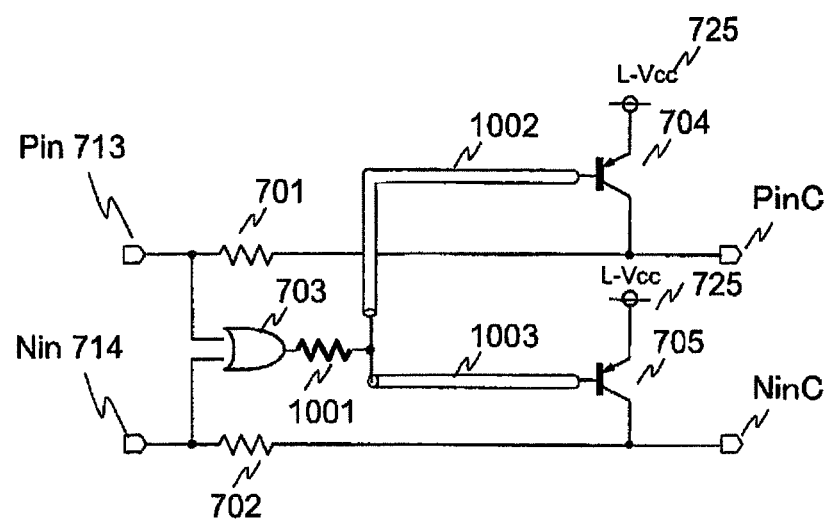
FIG. 8 A view showing the arrangement of a resistor 1001 in the simultaneous ON protection circuit 616U.
Figure 9:
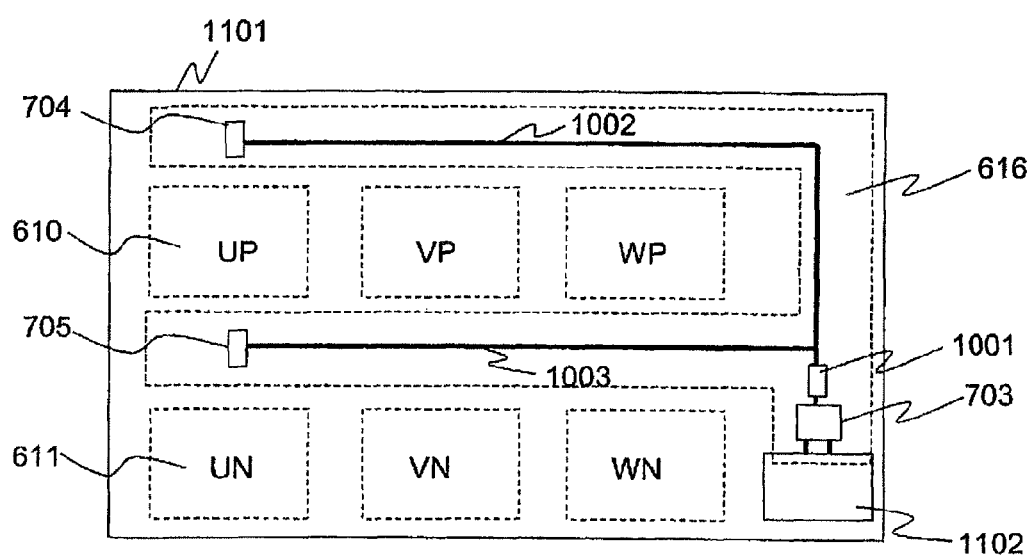
FIG. 9 A view showing the layout of wiring of the simultaneous ON protection circuit 616U on a drive circuit board 1101.

FIG. 8 and FIG. 9 are views for explaining the second embodiment of the invention. FIG. 8 is a circuit diagram of a simultaneous ON protection circuit 616U, and FIG. 9 is a view showing the layout of wiring of the simultaneous ON protection circuit 616U on a drive circuit board 1101. This embodiment is configured such that, as shown in FIG. 8 and FIG. 9, a series resistor 1001 is inserted into an output of an OR gate circuit 703. Although the explanation is made hereinafter by taking the simultaneous ON protection circuit 616U as an example, this embodiment is also applicable to simultaneous ON protection circuits 616V, 610W in substantially the same manner.

In general, a gate drive circuit is constituted of an upper-arm-use gate drive circuit which includes an upper arm driver IC and a lower-arm-use gate drive circuit which includes a lower arm driver IC, and the upper-arm-use gate drive circuit and the lower-arm-use gate drive circuit are arranged in an electrically insulated manner from each other. In the layout shown in FIG. 9, the upper-arm-use gate drive circuits 610U to 610W are arranged on an upper side of a substrate 1101 in the drawing, and the lower-arm-use gate drive circuits 611U to 611W are arranged on the substrate below the upper-arm-use gate drive circuits 610U to 610W with a space therebetween. In such an arrangement, PNP bipolar transistors 704, 705 of the simultaneous ON protection circuit 616U are arranged at places spaced apart from each other. Accordingly, an output of the OR gate circuit 703 connected to terminals 713, 714 (see FIG. 8) of a connector 1102 is wired to the PNP bipolar transistors 704, 705 using bifurcated lines consisting of long lines 1002, 1003.

In the simultaneous ON protection circuit 616U shown in FIG. 4, when an IC is used as the OR gate circuit 703, an output signal voltage of the OR gate circuit 703 steeply changes. When such a steeply changing voltage is inputted to the long lines 1002, 1003 shown in FIG. 9, the lines exhibit the behavior of a distributed constant circuit. Accordingly, unless processing such as impedance matching is taken at terminal portions of the lines, the reflection occurs thus giving rise to overshooting of a signal voltage. Further, in a case where the lines are provided in a bifurcated manner, when lengths of the lines are imbalanced, ringing is liable to occur due to reciprocation of a reflection signal. Such overshooting of the signal voltage, and ringing may cause an erroneous operation of the circuit, breaking of a semiconductor part and the like. On the other hand, when a resistor for impedance matching is provided to the terminal portions of the lines, there arises a drawback that a signal level is lowered or the power consumption is increased.

Accordingly, in this embodiment, the resistor 1001 shown in FIG. 8 and FIG. 9 is inserted into the output of the OR gate circuit 703 as a damping resistor. Due to the provision of the resistor 1001, a voltage change is attenuated in an output of the OR gate circuit 703 so that it is possible to prevent the reflection of signal at the terminal portions of the lines, that is, at bases of the PNP bipolar transistors 704, 705. A resistor of 1000, for example, is used as the resistor 1001.

When line lengths of the lines 1002, 1003 largely differ from each other, ringing is liable to be generated. Accordingly, it is desirable to set the line lengths of the lines 1002, 1003 equal as much as possible. For example, the line lengths of the lines 1002, 1003 can be set equal by routing the shorter line 1003 out of the lines 1002, 1003 in an elongated manner.
(Modification)

Figure 10:
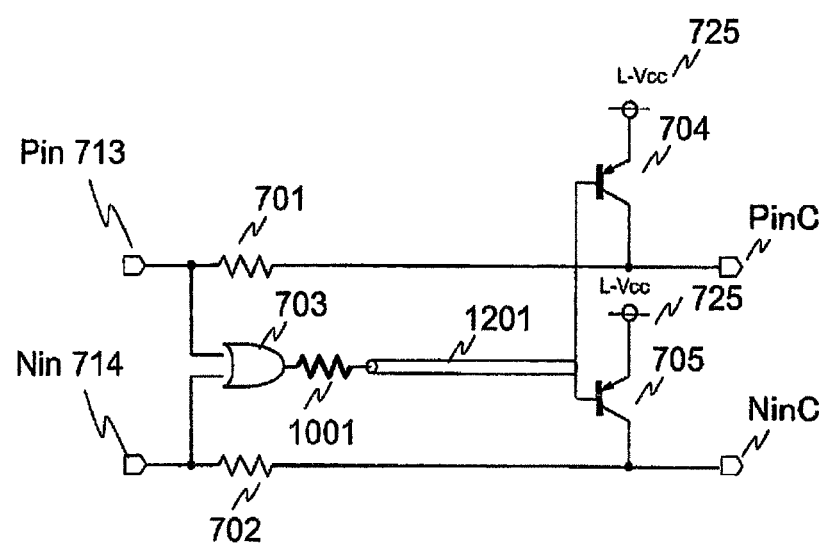
FIG. 10 A circuit diagram showing a modification of the simultaneous ON protection circuit 616U.
Figure 11:
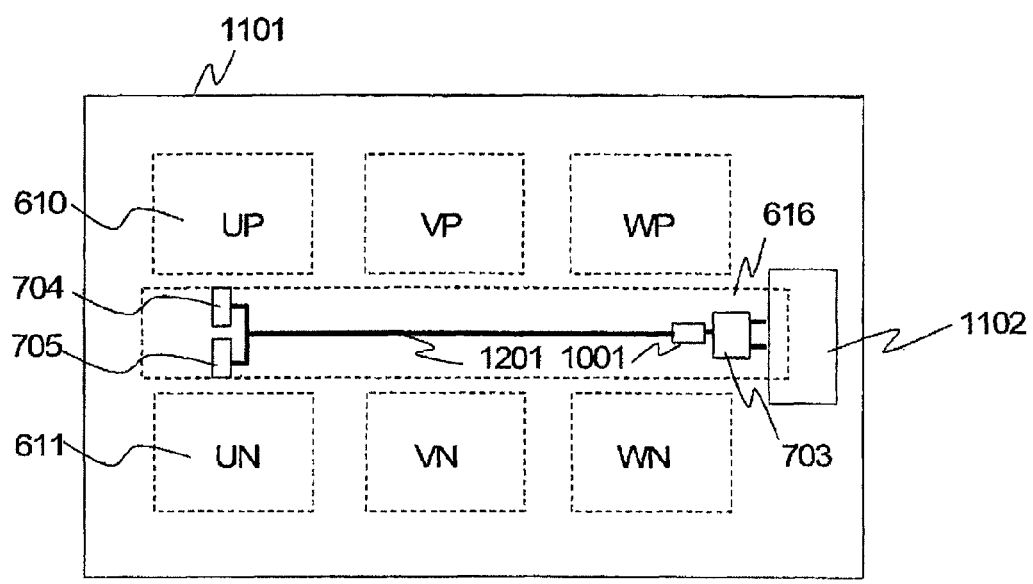
FIG. 11 A view showing a modification, and a view showing the layout of wiring of the simultaneous ON protection circuit 616U on the drive circuit board 1101.

FIG. 10 and FIG. 11 are views showing a modification of the second embodiment. FIG. 10 is a circuit diagram of a simultaneous ON protection circuit 616U, and FIG. 11 is a view showing the layout of wiring of the simultaneous ON protection circuit 616U on a drive circuit board 1101. Although the explanation is made hereinafter by taking the simultaneous ON protection circuit 616U as an example, this embodiment is also applicable to simultaneous ON protection circuits 616V, 610W in substantially the same manner.

In the embodiment shown in FIG. 8 and FIG. 9, the line is bifurcated into the long lines 1002, 1003 immediately after the resistor 1001, and the long lines 1002, 1003 are connected to the PNP bipolar transistors 704, 705 arranged on an upper side of the respective gate drive circuits 610U, 611U in the drawing. On the other hand, in the modification shown in FIG. 10 and FIG. 11, the PNP bipolar transistors 704, 705 are arranged in an open space formed between upper-arm-use gate drive circuits 610U to 610W and lower-arm-use gate drive circuits 611U to 611W, and an output of the OR gate circuit 703 and the PNP bipolar transistors 704, 705 are connected to each other via a single long line 1201. In the same manner as the above-mentioned embodiment, a resistor 1001 is inserted into an output of the OR gate circuit 703.

In the modification shown in FIG. 10 and FIG. 11, one long line 1201 is used in place of the bifurcated lines consisting of two long lines and hence, the occurrence of ringing can be easily prevented and a wiring space can be made smaller.

In this manner, even when the PNP bipolar transistors 704, 705 are arranged at places spaced apart from each other in circuit mounting, neither the reflection of signals nor ringing occur so that it is possible to prevent an erroneous operation of the circuit, breaking of a semiconductor part or the like.

As described above, the inverter device according to this embodiment includes: the inverter circuit which includes the upper-arm-use IGBTs 328U to 328W and the lower-arm-use IGBTs 330U to 330W; the PWM circuit 319 which outputs a first signal which is an ON/OFF command for the IGBTs 328U to 328W and a second signal which is an ON/OFF command for the IGBTs 330U to 330W; the gate drive circuits 610U to 610W which perform ON/OFF driving of the IGBTs 328U to 328W based on the ON/OFF command which is the first signal; the gate drive circuits 611U to 611W which perform ON/OFF driving of the IGBTs 330U to 330W based on the ON/OFF command which is the second signal; and the simultaneous ON protection circuits 616U to 616W which directly inputs the first signal outputted from the PWM circuit 319 to the gate drive circuits 610U to 610W and directly inputs the second signal outputted from the PWM circuit 319 to the gate drive circuits 611U to 611W when at least one of the first and second signals is an OFF command, and interrupts inputting of the first signal to the gate drive circuits 610U to 610W and inputting of the second signal to the gate drive circuits 611U to 611W and inputs a third signal which is an OFF command to the gate drive circuits 610U to 610W and the gate drive circuits 611U to 611W when both the first and second signals are ON commands.

As a result, when the simultaneous ON signal is generated, the IGBTs of the upper and lower arms are turned off so that short-circuiting of the upper and lower arms can be prevented. Further, when at least one of the first and second signals is an OFF command, that is, when a simultaneous ON signal is not generated, there is no possibility that the simultaneous ON protection circuits 616U to 616W affect the dead time of switching signals of the upper and lower arms.

For example, each of simultaneous ON protection circuits 616U to 616W may be constituted of PNP bipolar transistors 704, 705 and an OR gate circuit 703 described below. The PNP bipolar transistor 704 is provided on an input side of the gate drive circuits 610U to 610W. The PNP bipolar transistor 704 inputs a first signal Pin to the gate drive circuits 610U to 610W when the PNP bipolar transistor 704 is turned off, and interrupts inputting of the first signal to the gate drive circuits 610U to 610W and brings an input side of the gate drive circuits 610U to 610W into an OFF command input state when the PNP bipolar transistor 704 is turned on. On the other hand, the PNP bipolar transistor 705 is provided on an input side of the gate drive circuits 611U to 611W. The PNP bipolar transistor 705 inputs a second signal to the gate drive circuits 611U to 611W when the PNP bipolar transistor 705 is turned off, and interrupts inputting of the second signal into the gate drive circuits 611U to 611W and brings an input side of the gate drive circuits 611U to 611W into an OFF command input state when the PNP bipolar transistor 705 is turned on.

Further, the OR gate circuit 703 makes the PNP bipolar transistors 704, 705 perform an OFF operation when at least one of the first and second signals is an OFF command, and makes the PNP bipolar transistors 704, 705 perform an ON, operation when both first and second signals are ON commands.

Further, the gate drive circuits 610U to 610W, 611U to 611W respectively include driver ICs 710, 711 for generating a gate voltage, and a short pulse filter time of the driver ICs 710, 711 is set longer than a response time from a point of time that first and second signals in an ON command state are inputted to the OR gate circuit 703 to a point of time that the PNP bipolar transistors 704, 705 are turned on so that the above-mentioned occurrence of hazards in the simultaneous ON protection circuit 616U can be prevented.

The above-mentioned embodiments may be used in a single form or in combination because advantageous effects of the respective embodiments can be acquired singly or synergistically. Further, unless the technical features of the invention are not damaged, the invention is not limited to the above-mentioned embodiments in any way.

Although various embodiments and modifications have been explained heretofore, the invention is not limited to these contents. Other embodiments which are conceivable within the technical concept of the invention also fall within the scope of the invention.

The content of the disclosure of the following basic application from which the present application claim priority is incorporated in this specification in the form of cited document.

Japanese Patent Application 2010-085099 (filed on Apr. 1, 2010)

The invention claimed is:

1. An inverter device comprising:
an inverter circuit which includes an upper-arm-use first switching element and a lower-arm-use second switching element;
a control circuit which outputs a first signal which is an on or off (ON/OFF) command for the first switching element and a second signal which is an ON/OFF command for the second switching element respectively;
a first drive circuit which performs ON/OFF driving of the first semiconductor switching element based on the ON/OFF command which is the first signal;
a second drive circuit which performs ON/OFF driving of the second semiconductor switching element based on the ON/OFF command which is the second signal;
a first photocoupler having a first light emitting element for an input side of the first photocoupler and a first photosensitive element for an output side of the first photocoupler, the first photocoupler transmitting the first signal to the first drive circuit;
a second photocoupler having a second light emitting element for an input side of the second photocoupler and a second photosensitive element for an output side of the second photocoupler, the second photocoupler transmitting the second signal to the second drive circuit; and
a signal switching part which directly transmits the first and second signals outputted from the first photocoupler and the second photocoupler to the corresponding first and second drive circuits respectively when at least one of the first and second signals is an OFF command, the signal switching part inputting an OFF command from the first photocoupler and the second photocoupler to the corresponding first and second drive circuits respectively when both the first and second signals are ON commands, wherein
the signal switching part comprises a third switching element, a fourth switching element, and a logic circuit,
the first light emitting element works based on the first signal and transmits the ON/OFF command of the first signal from the first photocoupler to the first drive circuit substantially when the third switching element is in an OFF state, turns OFF the first light emitting element and outputs the OFF command from the first photocoupler to the first drive circuit when the third switching element is in an ON state,
the second light emitting element works based on the second signal and transmits the ON/OFF command of the second signal from the second photocoupler to the second drive circuit substantially when the fourth switching element is in an OFF state, turns OFF the second light emitting element, and outputs the OFF command from the second photocoupler to the second drive circuit substantially when the fourth switching element is in an ON state, and the logic circuit receives the first and second signals, and outputs a switching signal which turn ON the third switching element and the fourth switching element substantially when both the first and second signals are ON commands, and outputs a switching signal which makes the third switching element and the fourth switching element turn OFF substantially when at least one of the first and second signals is an OFF command.

2. The inverter device according to claim 1, wherein the first and second drive circuits include a driver IC for generating a gate voltage respectively, and a short pulse filter time of the driver IC is set longer than a response time from a point of time that the first and second signals in an ON command state are inputted to the logic circuit to a point of time that the third and fourth switching elements are brought into an interruption state.

3. The inverter device according to claim 1, wherein a resistor which prevents the reflection of a signal is connected in series to a signal output side of the logic circuit.

* * * * *